(12) United States Patent
Stafford et al.

(10) Patent No.: US 11,428,166 B2
(45) Date of Patent: Aug. 30, 2022

(54) FIN FOR INTERNAL COOLING OF VANE WALL

(71) Applicant: Solar Turbines Incorporated, San Diego, CA (US)

(72) Inventors: Scott L. Stafford, San Diego, CA (US); Juan Yin, San Diego, CA (US); Steven D. Gray, Poway, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 17/096,046

(22) Filed: Nov. 12, 2020

(65) Prior Publication Data

US 2022/0145799 A1    May 12, 2022

(51) Int. Cl.
    *F02C 7/12*     (2006.01)
    *F02C 6/00*     (2006.01)
    *F02C 7/04*     (2006.01)

(52) U.S. Cl.
    CPC .............. *F02C 7/12* (2013.01); *F02C 6/00* (2013.01); *F02C 7/04* (2013.01); *F05D 2220/32* (2013.01); *F05D 2240/35* (2013.01); *F05D 2260/22141* (2013.01); *F05D 2260/60* (2013.01)

(58) Field of Classification Search
    CPC ...... F02C 7/12; F02C 6/00; F02C 7/04; F05D 2220/32; F05D 2240/35; F05D 2260/22141; F05D 2260/60
    See application file for complete search history.

(56) References Cited

U.S. PATENT DOCUMENTS

| 2,879,028 | A |   | 3/1959  | Stalker     |           |
|-----------|---|---|---------|-------------|-----------|
| 3,301,527 | A | * | 1/1967  | Kercher     | F01D 5/189 |
|           |   |   |         |             | 415/115   |
| 3,767,322 | A |   | 10/1973 | Durgin et al. |         |
| 4,403,917 | A | * | 9/1983  | Laffitte    | F01D 5/188 |
|           |   |   |         |             | 415/115   |
| 4,437,810 | A |   | 3/1984  | Pearce      |           |
| 5,516,260 | A | * | 5/1996  | Damlis      | F01D 5/189 |
|           |   |   |         |             | 415/115   |

(Continued)

FOREIGN PATENT DOCUMENTS

EP    2573325 A1    3/2013

OTHER PUBLICATIONS

European Search Report for European Patent Appln. No. 21202041.6-1004/4006303, dated May 11, 2022 (8 pgs).

*Primary Examiner* — Jesse S Bogue
(74) *Attorney, Agent, or Firm* — Procopio, Cory, Hargreaves & Savitch LLP

(57) ABSTRACT

Gas turbine engines generally comprise a first-stage nozzle guide vane. Temperatures in a trailing-edge area of the suction-side wall of such vanes can exceed material and coating limits. While an insert can be used to form passages for cooling air to flow along the inner surfaces of the vane walls, design constraints prevent the insert from extending beyond a certain point into the trailing edge of the vane. Accordingly, a fin is disclosed for insertion downstream of the insert. By eliminating sudden expansion beyond the downstream end of the insert and maintaining the speed of the cooling air across the trailing-edge area of the suction-side wall, the fin improves the cooling coefficient for the trailing-edge area, so as to prevent or reduce excessive temperatures in the trailing-edge area.

11 Claims, 9 Drawing Sheets

(56) References Cited

U.S. PATENT DOCUMENTS

| | | | |
|---|---|---|---|
| 8,079,815 B2 | 12/2011 | Hada et al. | |
| 8,182,203 B2 * | 5/2012 | Hada | F01D 5/189 |
| | | | 415/115 |
| 9,879,554 B2 * | 1/2018 | Kim | F01D 5/189 |
| 2015/0267557 A1 * | 9/2015 | Facchinetti | F01D 5/147 |
| | | | 416/95 |
| 2017/0081966 A1 | 3/2017 | Huizenga et al. | |

* cited by examiner

FIN FOR INTERNAL COOLING OF VANE WALL

TECHNICAL FIELD

The embodiments described herein are generally directed to a vane in a gas turbine engine, and, more particularly, to a fin to improve the internal cooling of one or more walls of a nozzle guide vane.

BACKGROUND

Gas turbine engines for power generation typically comprise a first stage (e.g., in the compressor and/or turbine) that intakes air through a nozzle comprising nozzle guide vanes. In the turbine section, the walls of these vanes have a region, near the trailing edge (i.e., the aft of the vane, downstream from the throat), that is difficult to keep cool. Temperatures in this region can exceed material and coating limits. If the temperature is excessive, the vane wall can bulge outward into the flow path of the air, oxidize, and/or deform under the mechanical stress. While techniques exist to cool the vane wall on the pressure side (e.g., through-wall film cooling), the usage of such techniques to cool the vane wall on the suction side generally result in large penalties in turbine performance.

U.S. Patent Pub. No. 2015/0267557 illustrates an existing vane comprising an insert to aid in cooling of the vane wall. However, the insert poses manufacturing problems. In addition, the insert is not capable of extending into the trailing-edge region of the vane. Thus, such an insert is incapable of improving the cooling of the vane wall in the trailing-edge region.

The present disclosure is directed toward overcoming one or more of the problems discovered by the inventors.

SUMMARY

In an embodiment, a nozzle guide vane is disclosed that comprises: a casing having an upstream end and a downstream end, wherein the casing comprises a first suction-side wall from the leading end to the trailing end, a first pressure-side wall from the leading end to the trailing end, a first internal cavity between the first suction-side wall and the first pressure-side wall, and a plurality of partial pins that extend from the first suction-side wall and the first pressure-side wall partially into the first internal cavity; an insert having an upstream end and a downstream end, wherein the insert comprises a second suction-side wall, a second pressure-side wall, and a second internal cavity between the second suction-side wall and the second pressure-side wall, wherein the insert is configured to fit within a slot in the first internal cavity between the partial pins extending from the first suction-side wall and the partial pins extending from the first pressure-side wall; and a fin configured to fit within the slot between the downstream end of the insert and the downstream end of the casing.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" are relative to the flow direction of the primary gas (e.g., air) used in the combustion process, unless specified otherwise. It should be understood that "upstream" refers to a position that is closer to the source of the primary gas or a direction towards the source of the primary gas, and "downstream" refers to a position that is farther from the source of the primary gas or a direction that is away from the source of the primary gas. Thus, a trailing edge or end of a component (e.g., a vane) is downstream from a leading edge or end of the same component. Also, it should be understood that, as used herein, the terms "side," "top," "bottom," "front," and "rear" are used for convenience of understanding to convey the relative positions of various components with respect to each other, and do not imply any specific orientation of those components in absolute terms (e.g., with respect to the external environment or the ground).

Figure 1:
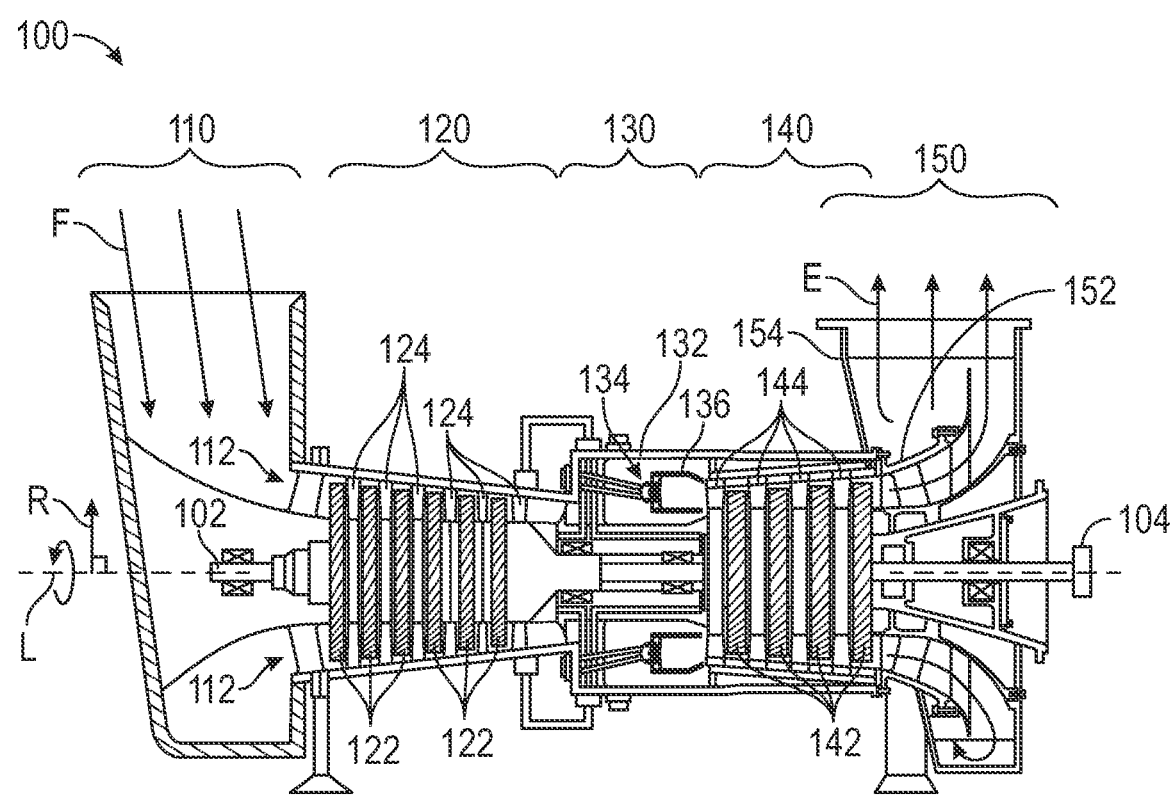
FIG. 1 illustrates a schematic diagram of a gas turbine engine, according to an embodiment.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L, and all references herein to radial, axial, and circumferential directions are relative to longitudinal axis L. A radial axis may refer to any axis or direction that radiates outward from longitudinal axis L at a substantially orthogonal angle to longitudinal axis L, such as radial axis R in FIG. 1. As used herein, the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F (e.g., a gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 housing one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The combusting fuel-gas mixture drives turbine 140.

Turbine 140 may comprise one or more turbine rotor assemblies 142 and stator assemblies 144. Each adjacent pairing of a stator assembly 144 with a turbine rotor assembly 142 may correspond to one of a plurality or series of stages. Turbine 140 extracts energy from the combusting fuel-gas mixture as it passes through each stage. The energy extracted by turbine 140 may be transferred (e.g., to an external system) via power output coupling 104.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
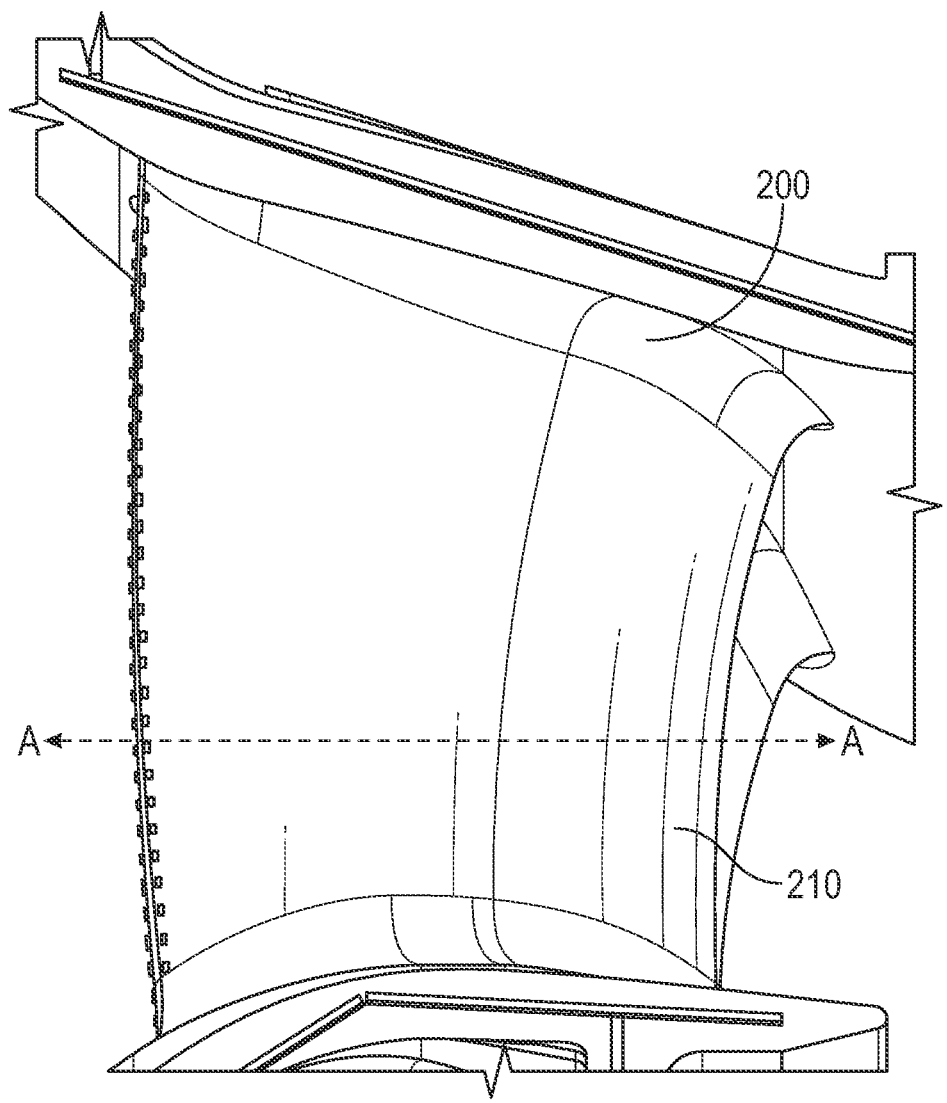
FIG. 2 illustrates a side view of a vane, according to an embodiment.

FIG. 2 illustrates a side view of a vane 200, according to an embodiment. One or more stator assemblies 144 may comprise one or a plurality of vanes 200. In an embodiment in which vane 200 is a nozzle guide vane, the stator assembly 144 in the first stage of turbine 140 may comprise vanes 200, whereas subsequent stages of turbine 140 may comprise different vanes. However, it should be understood that one or more subsequent stages (e.g., second stage) of turbine 140 could also comprise vanes 200. Vane 200 comprises a casing, with a longitudinal axis A that passes through the leading and trailing ends of vane 200. In FIG. 2, only a suction-side wall 210 of the casing of vane 200 is visible. It should be understood that the pressure-side wall of the casing of vane 200 is on the opposite side of vane 200 as suction-side wall 210.

Figure 3:
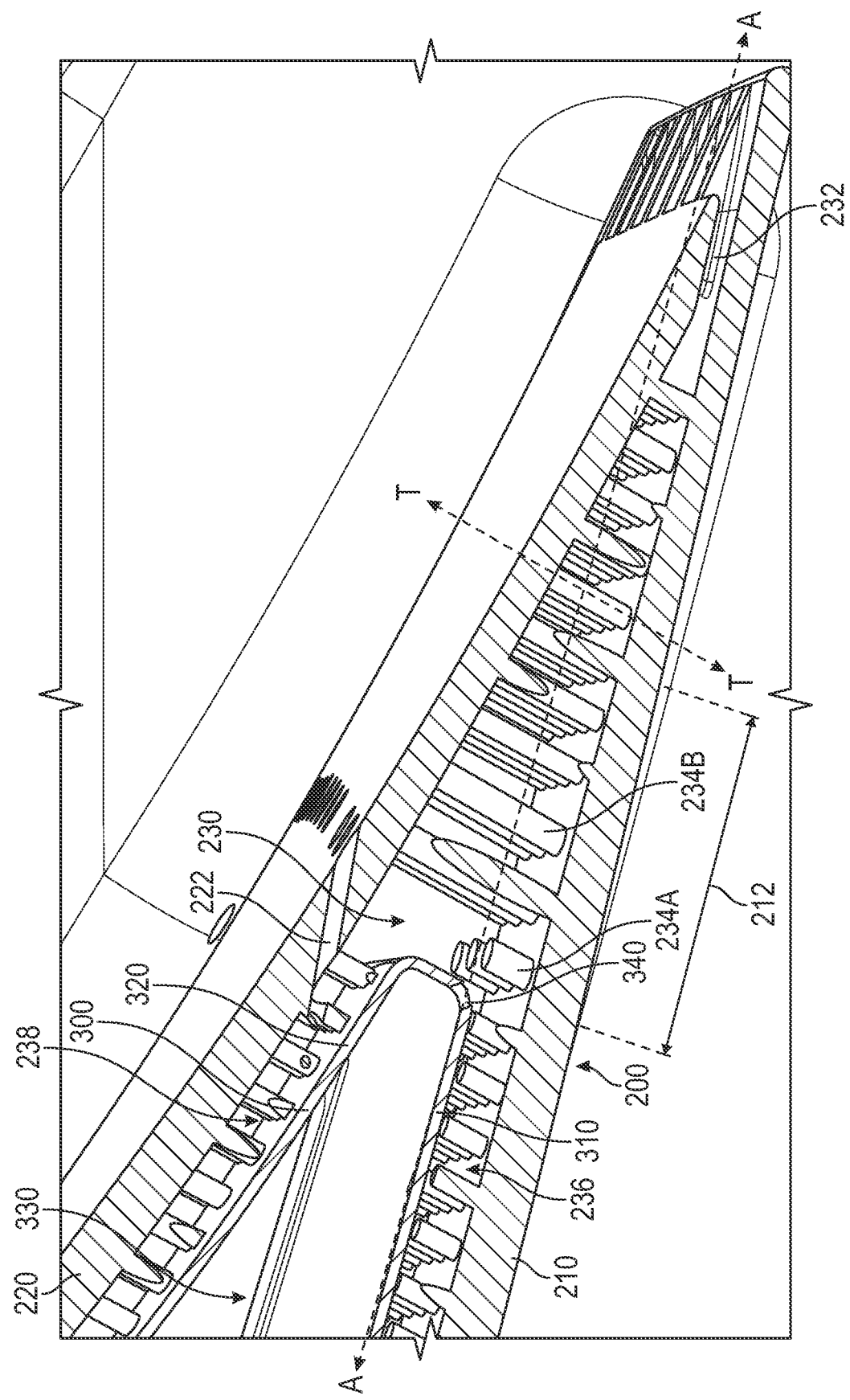
FIG. 3 illustrates a top or bottom cross-sectional view of a trailing-edge region of a vane, according to an embodiment.

FIG. 3 illustrates a top or bottom cross-sectional view of a trailing-edge region of a vane 200, according to an example. As illustrated, vane 200 comprises a suction-side wall 210 and a pressure-side wall 220. Suction-side wall 210 is on the side of vane 200 along which the airflow produces suction, and pressure-side wall 220 is on the side of vane 200 along which the airflow produces pressure. For convenience of understanding, internal components of vane 200 may be described as having a "suction side" and a "pressure side," even though those components do not themselves experience suction or pressure. It should be understood that, in these cases, the "suction side" refers to a side that is closest to suction-side wall 210, and the "pressure side" refers to a side that is closest to pressure-side wall 220.

Suction-side wall 210 and pressure-side wall 220 define an internal cavity 230 within vane 200. It should be understood that vane 200 may comprise additional side walls in a plane that intersects both of the planes of suction-side wall 210 and pressure-side wall 220, such that internal cavity 230 is fully enclosed, with the exception of various passages or openings.

In an embodiment, a plurality of pins 234 extend from suction-side wall 210 and pressure-side wall 220 into internal cavity 230, along or parallel to a transverse axis T that intersects longitudinal axis A (e.g., an orthogonal, acute, or obtuse angle). Some pins 234A, referred to herein as "partial pins," extend only partially into internal cavity 230 from suction-side wall 210 and/or pressure-side wall 220. Other pins 234B, referred to herein as "full pins," extend entirely through internal cavity 230 from suction-side wall 210 to pressure-side wall 220. In an embodiment, each pin 234 is cylindrical. However, it should be understood that pins 234 may have a different shape or cross-section.

Internal cavity 230 may be in fluid communication with an external environment of vane 200 via one or more passages. For example, pressure-side wall 220 of vane 200 may comprise one or a plurality of rows of film holes 222. Each film hole 222 may fluidly connect internal cavity 230 to the external environment. As illustrated, each film hole 222 may extend at an angle through pressure-side wall 220, such that the air flows from internal cavity 230, through film hole 222, to the external environment in a generally downstream direction. It should be understood that the air flowing through passages 222 will mix with air flowing over pressure-side wall 220. The cooling air flowing through film holes 222 may act to cool pressure-side wall 220.

In addition, vane 200 may comprise one or a plurality of passages 232 through the trailing edge of vane 200. Passages 232 may be arranged in a row through the trailing edge of vane 200. Each passage 232 may fluidly connect internal cavity 230 to the external environment. As illustrated, each passage 232 may extend along or parallel to longitudinal axis A (i.e., through the leading and trailing edges) of vane 200, such that the air flows from internal cavity 230, through passage 232, to the external environment in a substantially downstream direction. It should be understood that the air flowing through passages 232 will mix with air flowing across the trailing edge of vane 200. In the illustrated embodiment, passages 232 are arranged between suction-side wall 210 and pressure-side wall 220, and suction-side wall 210 extends farther downstream than pressure-side wall 220, such that the air exits vane 200 on the pressure side of vane 200.

In an embodiment, vane 200 comprises a volumetric insert 300 within internal cavity 230. As illustrated, insert 300 may have a generally wedge-shaped cross-section, and may be positioned between partial pins 234A extending from suction-side wall 210 and partial pins 234A extending from pressure-side wall 220. In other words, insert 300 is tightly positioned and held between partial pins 234A. Notably, a suction-side wall 310 of insert 300 is substantially parallel to suction-side wall 210 of vane 200 to form a narrow suction-side passage 236, and a pressure-side wall 320 of insert 300 is substantially parallel to pressure-side wall 220 of vane 200 to create a narrow pressure-side passage 238.

Suction-side wall 310 and pressure-side wall 320 of insert 300 may define an internal cavity 330 and an outlet 340 that provides fluid communication between internal cavity 330 of insert 300 and internal cavity 230 of vane 200. In other words, air may flow from internal cavity 330 to internal cavity 230 via outlet 340. Outlet 340 may be positioned at a downstream end of insert 300, and may comprise a row of impingement holes.

During operation, cooling air flows through passages 236 and 238 between insert 300 and the internal surfaces of suction-side wall 210 and pressure-side wall 220, respectively. This cooling air may be introduced into vane 200 at an upstream position. Once introduced, the cooling air flows along the internal surfaces of the walls of vane 200, via passages 236 and 238, to cool the vane walls. In other words, insert 300 constrains the flow of cooling air to narrow passages 236 and 238, abutting the vane walls, to cool the vane walls.

However, insert 300 is limited by manufacturing constraints, such as minimum bend radius and core thickness. Thus, insert 300 is unable to be extended far enough downstream to maintain a constant internal flow area in the trailing-edge region of vane 200. Consequently, as cooling air exits passages 236 and 238 at the downstream end of insert 300, a sudden expansion in the internal cooling air flow decreases the velocity of the cooling air, thereby reducing the cooling effectiveness of the air flow on the vane walls. This can result in excessive temperatures in the trailing-edge region of vane 200, and particularly in trailing-edge area 212 of suction-side wall 210.

Figure 4:
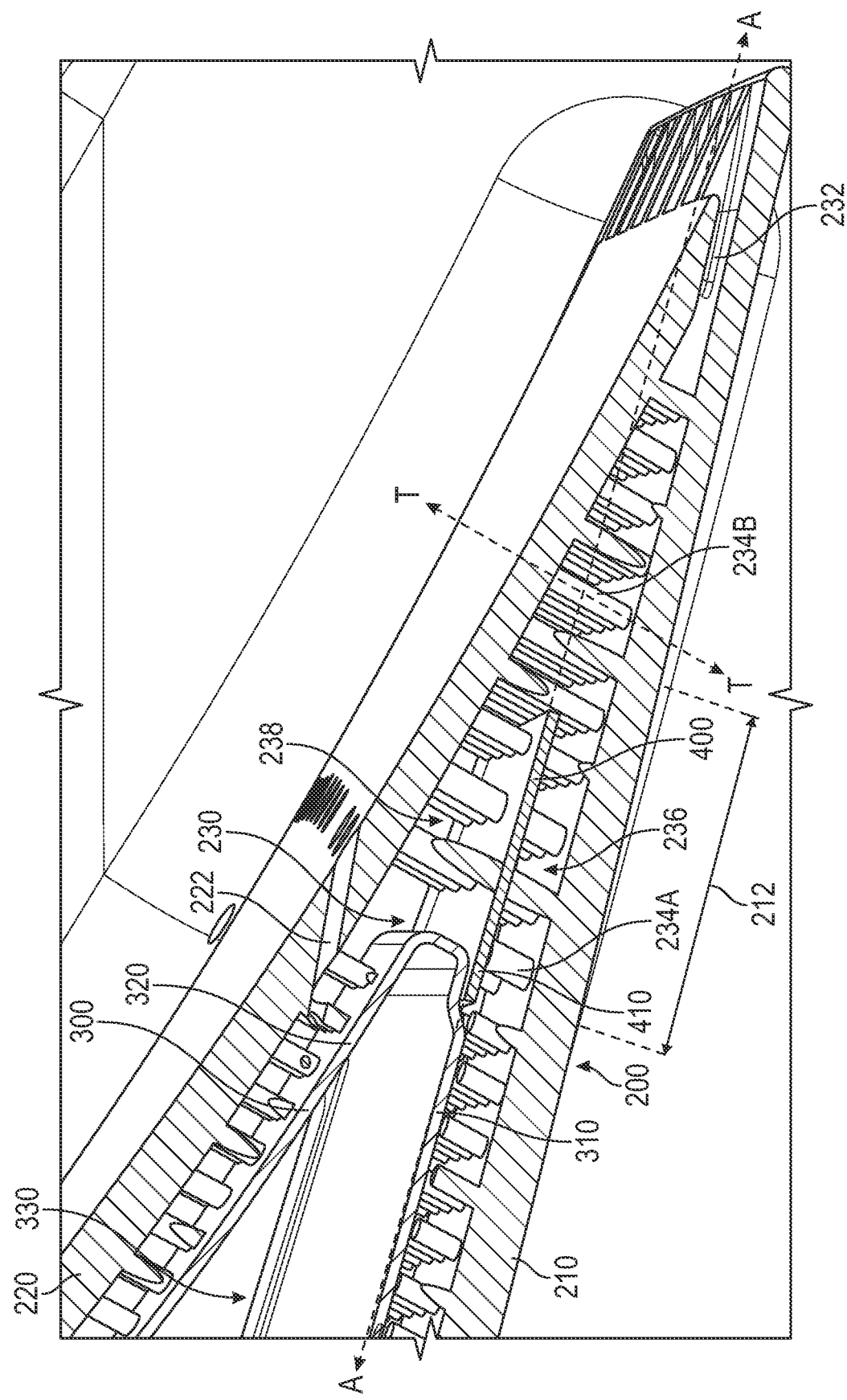
FIG. 4 illustrates a top or bottom cross-sectional view of a trailing-edge region of a vane with an inserted fin, according to an embodiment.

FIG. 4 illustrates a top or bottom cross-sectional view of a trailing-edge region of vane 200, with a fin 400 to improve cooling of a trailing-edge area 212 of suction-side wall 210, according to a first embodiment. In this first embodiment, fin 400 comprises a thin rectangular section that extends more downstream into the trailing-edge region of vane 200 than insert 300. The trailing edge of insert 300 may be modified to accommodate fin 400. For example, as illustrated, a recess, notch, groove, or other deformity may be formed in the downstream edge of suction-side wall 310 of insert 300, such that the downstream end of insert 300 overlaps with an upstream end 410 of fin 400. In addition, outlet 340 may be removed from insert 300, since it is no longer necessary for cooling of suction-side wall 210 of vane 200, because of the addition of fin 400.

Specifically, fin 400 is positioned downstream (i.e., aftward) of insert 300 to act as an extension of insert 300 in the downstream direction. Fin 400 effectively extends passage 236 (e.g., in the embodiments illustrated in FIGS. 4, 7, and 8) and passage 238 (e.g., in the embodiments illustrated in FIGS. 7 and 8) to maintain the speed of the cooling air flowing at a speed, which, in turn, maintains the cooling coefficient of the cooling air for a greater distance (i.e., beyond insert 300) toward the trailing end of vane 200. Thus, cooling air with a higher cooling coefficient flows over trailing-edge area 212 of suction-side wall 210, thereby preventing excessive temperatures or otherwise reducing temperatures in trailing-edge area 212.

Figure 5:
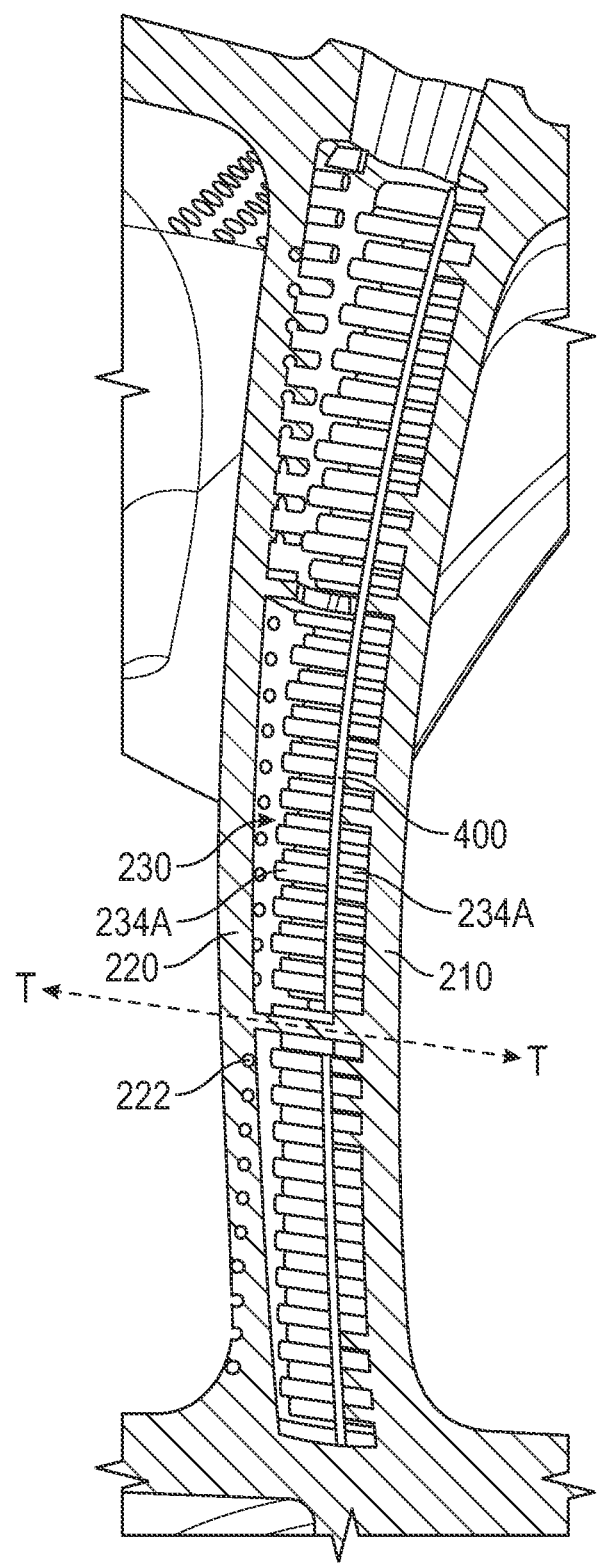
FIG. 5 illustrates a rear cross-sectional view of a trailing-edge region of a vane with an inserted fin, according to an embodiment.

FIG. 5 illustrates a rear cross-sectional view of a trailing-edge region of a vane 200, cut along a lateral axis that is orthogonal to longitudinal axis A of vane 200, according to an embodiment. As illustrated, fin 400 is positioned within internal cavity 230, closer to suction-side wall 210 than pressure-side wall 220. Alternatively, fin 400 could be positioned equidistantly between suction-side wall 210 and pressure-side wall 220 or closer to pressure-side wall 220 than suction-side wall 210. However, since suction-side wall 210 is more susceptible to excessive temperatures within trailing-edge area 212 (e.g., due to the lack of existing cooling techniques), it is generally preferable to position fin 400 so as to extend passage 236. Notably, as illustrated, when suction-side wall 210 of vane 200 is curved, fin 400 may follow this curve, so as to be substantially concentric or parallel with the curve of suction-side wall 210. In other words, passage 236 is of uniform width at every point between fin 400 and the internal surface of suction-side wall 210. This uniformity ensures a consistent, constant flow area through passage 236, downstream from insert 300, to prevent sudden expansion of cooling air. As a result, the cooling air may maintain a higher velocity along suction-side wall 210. This can increase the internal heat transfer coefficient by approximately 60% and reduce the temperature in trailing-edge area 212 of suction-side wall 210 by approximately 40-90 degrees Fahrenheit.

Figure 6:
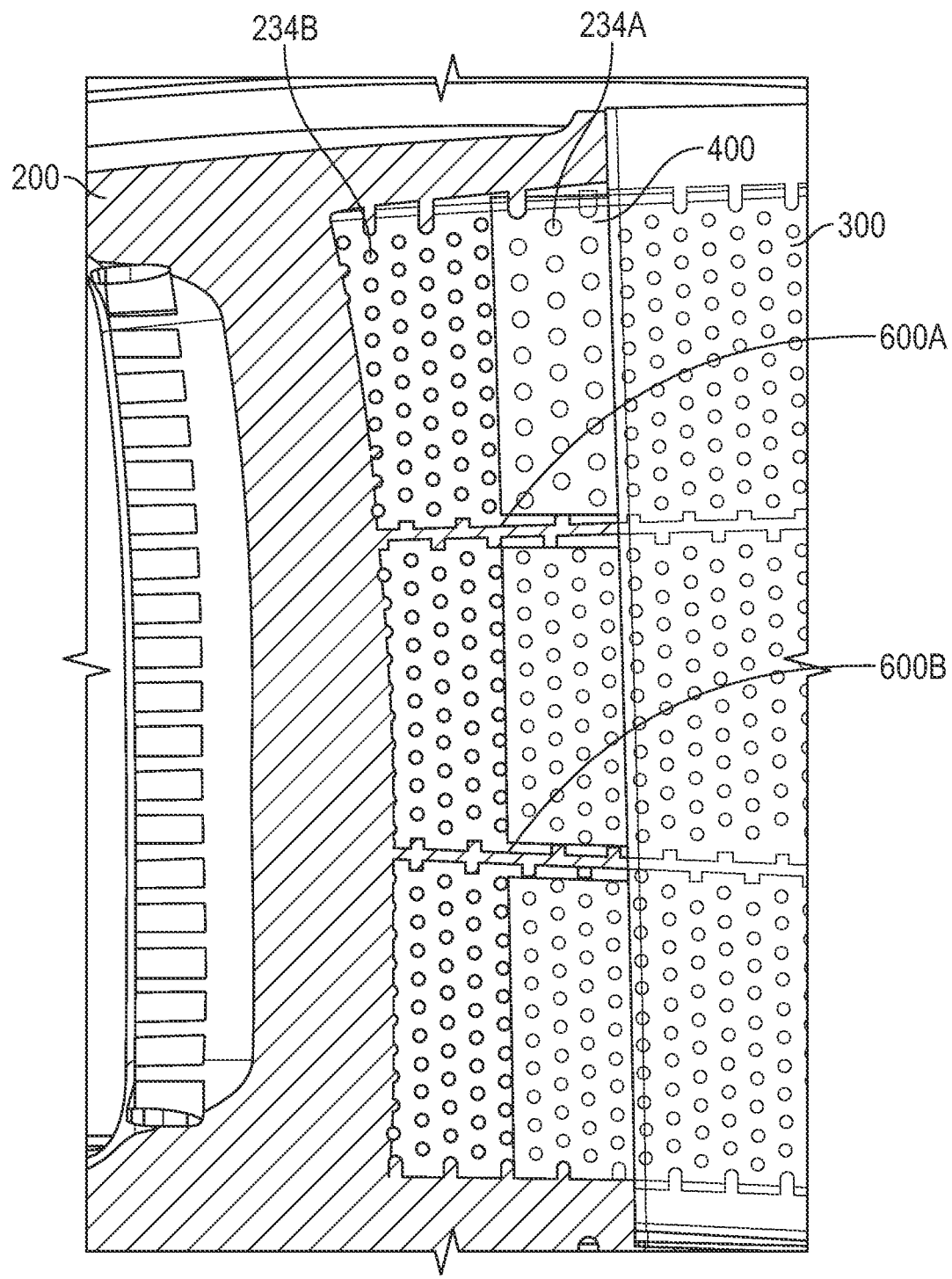
FIG. 6 illustrates a side view of a trailing-edge region of a vane with an inserted fin, according to an embodiment.

FIG. 6 illustrates a side view of a trailing-edge region of a vane 200, according to an embodiment. In this view, a portion of pressure-side wall 220 has been removed to illustrate the positions of insert 300 and fin 400. In an embodiment, internal cavity 230 may be divided into a plurality of sections by one or more ribs 600. In the illustrated embodiment, internal cavity 230 is divided into three sections by two ribs 600A and 600B. However, it should be understood that internal cavity 230 could be divided into any number of sections (e.g., two, four, five, etc.) by any number of ribs 600 (e.g., one, three, four, etc.), or may consist of only a single section with no ribs.

In the illustrated embodiment of FIGS. 4-6, fin 400 is a substantially two-dimensional structure that cooperates with insert 300 at the downstream end of insert 300. In alternative embodiments, fin 400 may be a three-dimensional structure, for example, formed with a triangular or other cross-sectional shape. In either embodiment, fin 400 may comprise sheet metal (e.g., approximately 0.015 inches thick) and may comprise one or a plurality of pieces of material. In an embodiment in which fin 400 is a three-dimensional structure, fin 400 may be formed by bending the sheet metal into the three-dimensional structure. However, it should be understood that other materials and methods of manufacture may be used to create fin 400. In any case, the trailing, downstream end of insert 300 may be configured to accommodate or otherwise correspond to the leading, upstream end of fin 400. For example, when vane 200 is assembled, fin 400 may tightly abut or mate with insert 300, so as to be contiguous with insert 300 and provide a substantially or nearly continuous, planar surface on the side of passage 236 opposite suction-side wall 210. In other words, fin 400 may lie in the same plane as suction-side wall 310 of insert 300 to form a substantially uniform passage 236.

As illustrated, the leading, upstream edge of fin 400 may tightly abut the trailing, downstream edge of insert 300, with little or no space between fin 400 and insert 300. In an embodiment, fin 400 is not joined or otherwise coupled to insert 300. This may facilitate assembly and disassembly of vane 200. However, in an alternative embodiment, fin 400 could be joined or otherwise coupled to insert 300.

Figure 7:
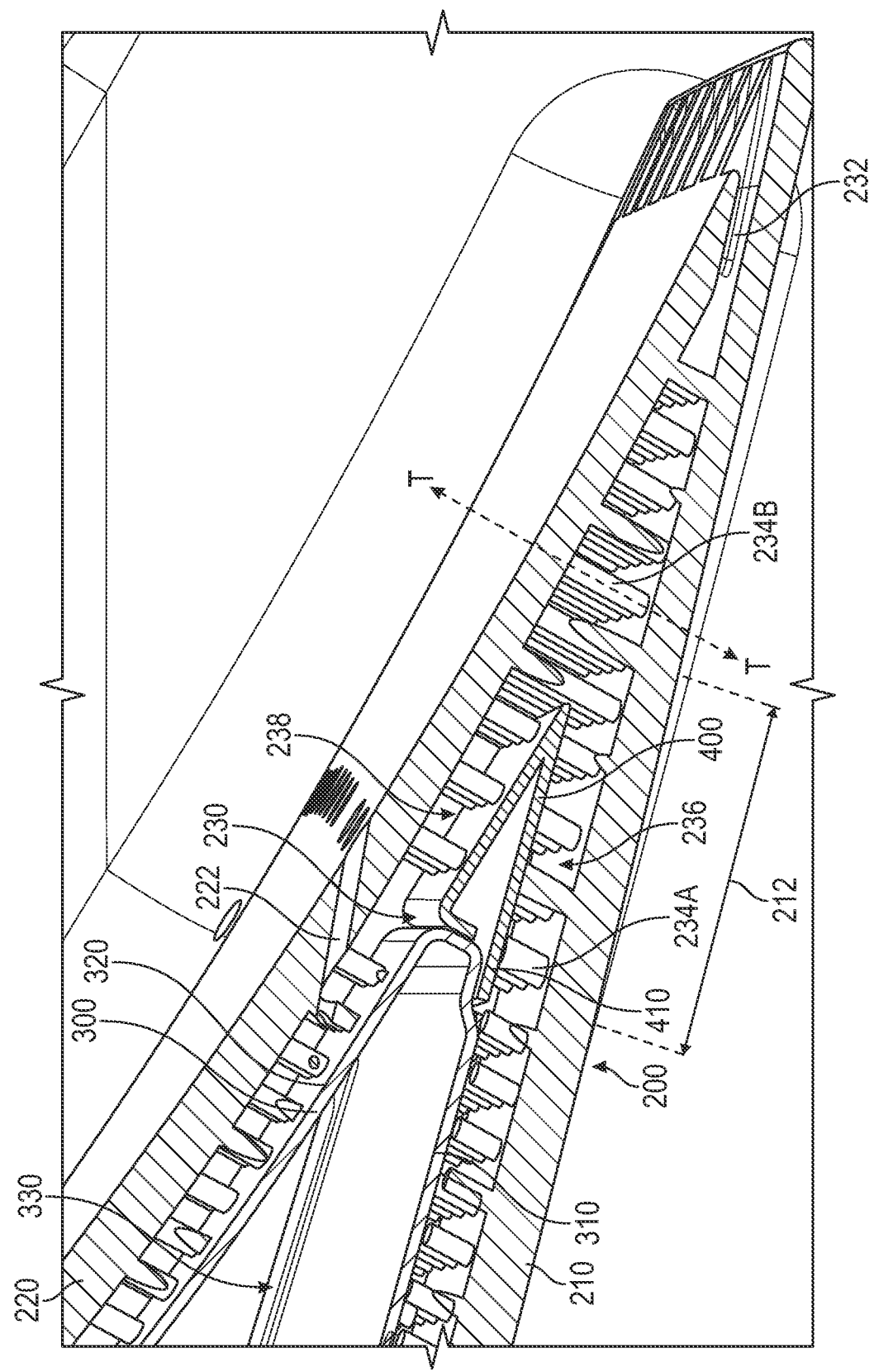
FIG. 7 illustrates a top or bottom cross-sectional view of a trailing-edge region of a vane with an inserted fin, according to an alternative embodiment.

FIG. 7 illustrates a cross-sectional view of a trailing-edge region of a vane 200, with a volumetric fin 400 to improve cooling of the trailing-edge region of suction-side wall 210, according to a second embodiment. Whereas fin 400 of the first embodiment, illustrated in FIG. 4, had a linear cross-section, fin 400 of the second embodiment, as illustrated in FIG. 7, has a substantially triangular cross-section. The dimensions of this triangular cross-section may be selected such that the upstream end of fin 400 is substantially identical or similar in dimension as the downstream end of insert 300. Thus, when vane 200 is assembled, fin 400 may tightly abut or mate with insert 300, so as to provide a substantially or nearly continuous, planar surface on the side of passage 238 opposite pressure-side wall 220, as well as on the side of passage 236 opposite suction-side wall 210. In other words, the suction-side wall of fin 400 may lie in the same plane as suction-side wall 310 of insert 300 to form a substantially uniform passage 236 along suction-side wall 210 of vane 200, and the pressure-side wall of fin 400 may lie in the same plane as pressure-side wall 320 of insert 300 to form a substantially uniform passage 238 along pressure-side wall 220 of vane 200.

Essentially, in the second embodiment, fin 400 is a wedge that extends both passages 236 and 238 beyond the downstream end of insert 300. As illustrated, the downstream end of insert 300 may be configured to accommodate at least a portion of fin 400. For example, as illustrated, a recess may be formed in suction-side wall 310 of insert 300, at the downstream end of insert 300. The recess may be configured in size and shape to receive an upstream end 410 of fin 400. In an alternative embodiment, a recess could be formed in pressure-side wall 320 of insert 300, and fin 400 could be reversed such that upstream end 410 fits into the recess in pressure-side wall 320 of insert 300. This second embodiment of fin 400 may be formed by bending a flat piece of sheet metal back over itself to an acute angle (e.g., that matches the angle of pressure-side wall 320 relative to suction-side wall 310 of insert 300), and then bending an end of the folded-over piece back towards upstream end 410, and optionally downstream of the upstream edge of upstream end 410 so that upstream end 410 may overlap with the downstream end of insert 300.

Figure 8:
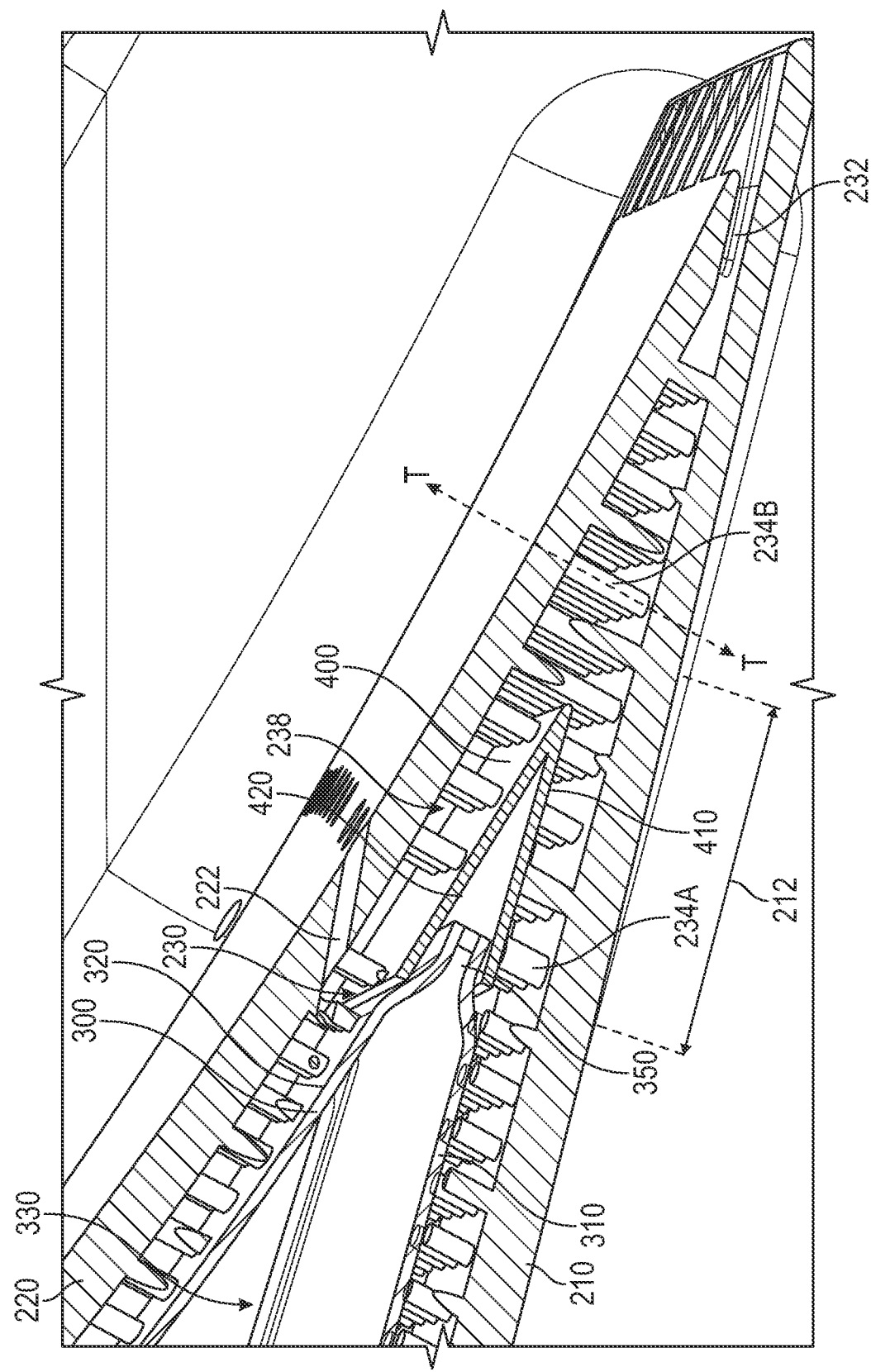
FIG. 8 illustrates a top or bottom cross-sectional view of a trailing-edge region of a vane with an inserted fin, according to an alternative embodiment.

FIG. 8 illustrates a top or bottom cross-sectional view of a trailing-edge region of a vane 200, with a volumetric fin 400 to improve cooling of the trailing-edge region of suction-side wall 210, according to a third embodiment. As with the second embodiment, illustrated in FIG. 7, the third embodiment, illustrated in FIG. 8, also has a substantially triangular cross-section. However, in the third embodiment, the downstream ends of suction-side wall 310 and pressure-side wall 320 of insert 300 converge to a substantially symmetrical flat or pointed end 350. Essentially, the downstream end of insert 300 comprises a first recess on the suction side and a second recess on the pressure side. A suction-side end 410 of fin 400 may be configured to overlap with end 350 on the suction side of insert 300, and a pressure-side end 420 of fin 400 may be configured to overlap with end 350 on the pressure side of insert 300. In other words, end 350 of insert 300 can slide into the interior of fin 400 between suction-side end 410 and pressure-side end 420 of fin 400. Thus, as in the second embodiment, when vane 200 is assembled, fin 400 may tightly abut or mate with insert 300, so as to provide a substantially or nearly continuous, planar surface on both the side of passage 236 opposite suction-side wall 210 and the side of passage 238 opposite pressure-side wall 220. In other words, the suction-side wall of fin 400 may lie in the same plane as suction-side wall 310 of insert 300 to form a substantially uniform passage 236 along suction-side wall 210 of vane 200, and the pressure-side wall of fin 400 may lie in the same plane as pressure-side wall 320 of insert 300 to form a substantially uniform passage 238 along pressure-side wall 220 of vane 200. Similarly to the second embodiment, in the third embodiment, fin 400 acts as a wedge that extends both passages 236 and 238 beyond the downstream end of insert 300. This third embodiment of fin 400 may be formed by bending a flat piece of sheet metal in half and back over itself to an acute angle (e.g., that matches the angle of pressure-side wall 320 relative to suction-side wall 310 of insert 300), to form the triangular cross-section illustrated in FIG. 8.

INDUSTRIAL APPLICABILITY

A gas turbine engine 100 for power generation may comprise a plurality of nozzle guide vanes 200 in the initial one or two stages of the intake of turbine 140. Each nozzle guide vane 200 may be hollow with an internal cavity 230. An insert 300 is inserted into internal cavity 230 to provide a cooling system within each nozzle guide vane 200. Specifically, the suction-side and pressure-side walls of insert 300 are substantially parallel to the corresponding surfaces of internal cavity 230 to form narrow passages 236 and 238 within internal cavity 230, respectively. Passages 236 and 238 provide a flow path, in contact with internal surfaces of suction-side wall 210 and pressure-side wall 220, for cooling air. Thus, cooling air may flow over these internal surfaces to cool suction-side wall 210 and pressure-side wall 220.

In an embodiment, a fin 400 is inserted downstream and abutting insert 300 to extend the effective inner surfaces of narrow cooling passages 236 and 238 beyond the downstream end of insert 300. This maintains the speed of the cooling air downstream from insert 300 and closer to the trailing-edge region of each vane 200, by eliminating the sudden expansion and reduced speed of the cooling air at the downstream end of insert 300. In turn, this improves the cooling coefficient closer to the trailing-edge region of each vane 200, including in trailing-edge area 212 of suction-side wall 210. For example, experiments have found that the presence of fin 400 can increase the internal heat transfer coefficient by approximately 60% and reduce the temperature of trailing-edge area 212 of suction-side wall 210 by approximately 40-90 degrees Fahrenheit.

As discussed above, fin 400 may comprise one or more pieces of sheet metal or other material that is formed into a two-dimensional structure (e.g., with a linear cross-section)

or a three-dimensional structure (e.g., with a triangular cross-section) by bending or other method of manufacture. Regardless of the particular shape of fin 400, downstream end of insert 300 may be configured to accommodate or otherwise correspond to (e.g., overlap) an upstream end 410 of fin 400, such that the surfaces defining passages 236 and 238 remain substantially uniform and contiguous across the position at which the downstream end of insert 300 abuts the upstream end of fin 400.

Vane 200 may comprise a plurality of internal pins 234, including partial pins 234A and full pins 234B, arranged in a grid. The area of vane 200 comprising full pins 234B may be limited to the downstream end of internal cavity 230 corresponding to the trailing edge of vane 200. All pins 234 in the area extending from the upstream end of vane 200 to the downstream end of fin 400 may be partial pins 234A. Partial pins 234A may be cast in pairs, with each pair comprising a first partial pin 234A extending from suction-side wall 210 and a second partial pin 234A extending from pressure-side wall 220 and aligned with the first partial pin 234A along a transverse axis T. A gap may exist between each pair of partial pins 234A, and collectively, the gaps between all pairs of partial pins 234A may form a slot that is sized and shaped to receive fin 400 and insert 300. Thus, during assembly of vane 200, fin 400 may be inserted into the slot (e.g., via an opening in the outer shroud of vane 200) before insert 300 is inserted, and positioned as close to the trailing edge of vane 200 as it can fit, for example, such that the downstream end of fin 400 abuts the most upstream row of full pins 234B near the trailing edge of vane 200. Next, insert 300 may be inserted into the slot (e.g., via an opening in the outer shroud of vane 200), and positioned such that the downstream end of insert 300 abuts and/or overlaps the upstream end of fin 400. It should be understood that partial pins 234A may tightly surround fin 400 and insert 300, so as to prevent movement (e.g., in a transverse direction) of fin 400 and insert 300. In addition, fin 400 is prevented from movement in the upstream direction by insert 300 and in the downstream direction by one or more rows of full pins 234B.

Figure 9:
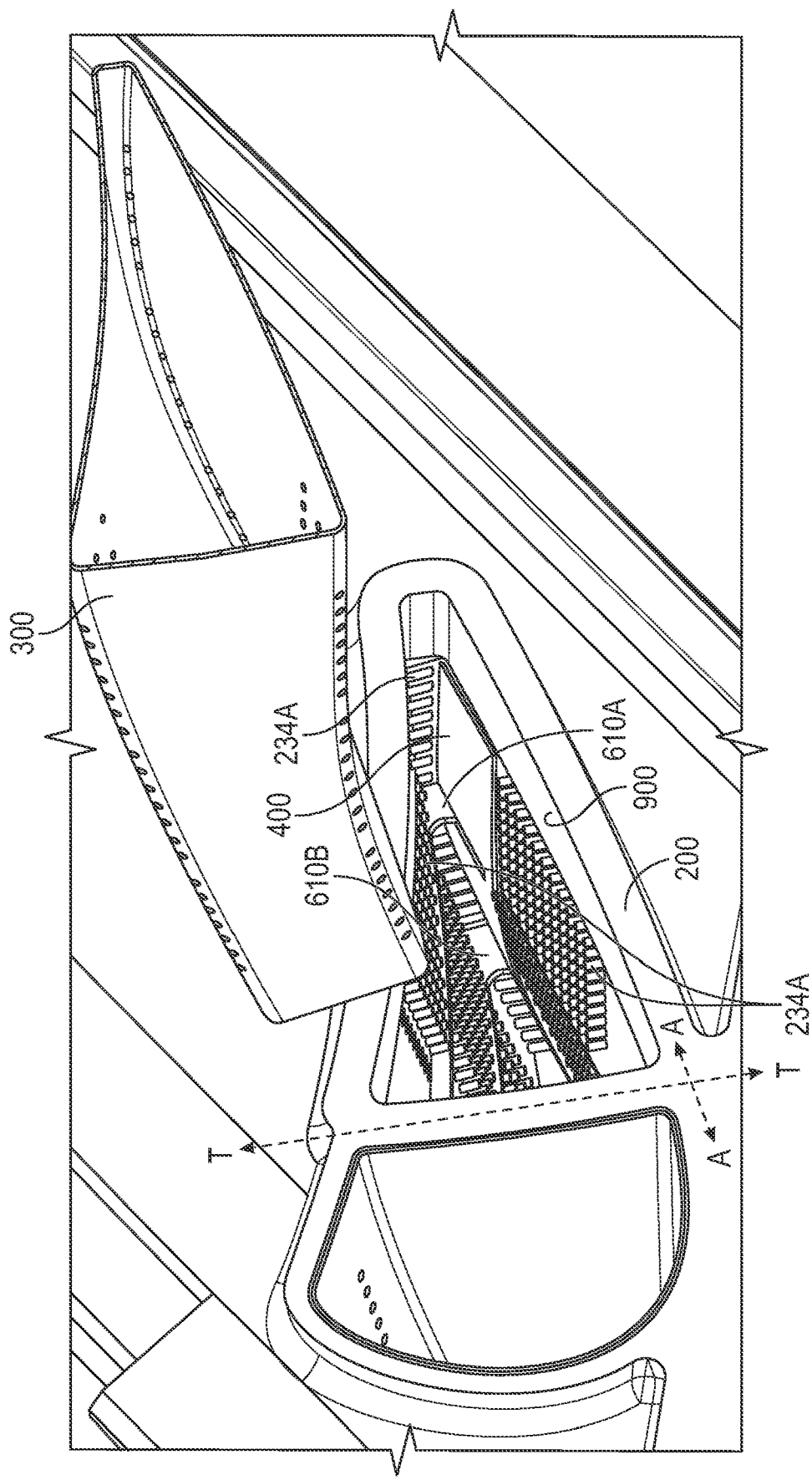
FIG. 9 illustrates a partially disassembled view of a vane, according to an embodiment.

FIG. 9 illustrates a partially disassembled view of a vane 200, according to an embodiment. As illustrated, insert 300 has been removed from vane 200, exposing an opening 900 and fin 400. In the illustrated embodiment, insert 300 and fin 400 are assembled, through an opening 900 in vane 200, into the slot formed by partial pins 234A. Due to design constraints on vane 200, opening 900 is limited in size. As illustrated, fin 400 may be assembled first into the downstream portion of the slot formed by partial pins 234A. Fin 400 may be formed as a single piece with one or more slots that are sized and spaced to tightly receive one or more corresponding rib extensions 610 (e.g., 610A and 610B) which extend, along transverse axis T, from ribs 600. Thus, fin 400 may be inserted through opening 900 laterally, and then slid downstream so that the slots in fin 400 slide around rib extensions 610. In an alternative embodiment, rib extensions 610 may be slotted to accept an unslotted, continuous fin 400. Next, insert 300 may be assembled through opening 900 to abut the upstream end of fin 400 at the downstream end of insert 300.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a nozzle guide vane of a gas turbine engine, it will be appreciated that it can be implemented in various other types of vanes and machines with vanes, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A nozzle guide vane comprising:
    a casing having an upstream end and a downstream end, wherein the casing comprises a first suction-side wall from the leading end to the trailing end, a first pressure-side wall from the leading end to the trailing end, a first internal cavity between the first suction-side wall and the first pressure-side wall, and a plurality of partial pins that extend from the first suction-side wall and the first pressure-side wall partially into the first internal cavity;
    an insert having an upstream end and a downstream end, wherein the insert comprises a second suction-side wall, a second pressure-side wall, and a second internal cavity between the second suction-side wall and the second pressure-side wall, wherein the insert is configured to fit within a slot in the first internal cavity between the partial pins extending from the first suction-side wall and the partial pins extending from the first pressure-side wall; and
    a fin configured to fit within the slot between the downstream end of the insert and the downstream end of the casing;
    wherein the fin has a linear cross-section, and wherein the fin, when seated between the downstream end of the insert and the downstream end of the casing, is in a same plane as the second suction-side wall of the insert, to form a uniform passage extending between the first suction-side wall and the second suction-side wall and between the first suction-side wall and the fin; and
    wherein the downstream end of the insert comprises a recess that is configured to receive an upstream end of the fin.

2. The nozzle guide vane of claim 1, wherein the fin comprises an upstream end that is configured to abut the downstream end of the insert.

3. The nozzle guide vane of claim 1, wherein the recess is further configured such that the downstream end of the insert overlaps with the upstream end of the fin.

4. The nozzle guide vane of claim 1, wherein the fin is made from sheet metal.

5. The nozzle guide vane of claim 1, further comprising a plurality of full pins that extend through the first internal cavity between the first suction-side wall and the first pressure-side wall, wherein the full pins are positioned at a downstream end of the first internal cavity to abut a downstream end of the fin.

6. The nozzle guide vane of claim 1, wherein the fin is formed from a single piece of material.

7. The nozzle guide vane of claim 1, wherein the fin comprises an assembly of a plurality of pieces of material.

8. The nozzle guide vane of claim 1, wherein each of the plurality of partial pins that extends from the suction-side wall is aligned with one of the plurality of partial pins that extends from the pressure-side wall.

9. The nozzle guide vane of claim 1, wherein the downstream end of the casing comprises one or more passages that fluidly connect the first internal cavity to an exterior of the casing.

10. A turbine comprising a plurality of stages of vanes, wherein a first one of the plurality of stages of vanes comprises a plurality of the nozzle guide vane of claim 1.

11. A gas turbine engine comprising:
a compressor;
a combustor downstream from the compressor; and
the turbine of claim 10 downstream from the combustor.

* * * * *